(12) United States Patent
Goia et al.

(10) Patent No.: US 7,842,274 B2
(45) Date of Patent: Nov. 30, 2010

(54) PROCESS FOR MANUFACTURE OF SILVER-BASED PARTICLES AND ELECTRICAL CONTACT MATERIALS

(75) Inventors: Dan Goia, Potsdam, NY (US); Sebastian Fritzsche, Hanau (DE); Bernd Kempf, Kleinwallstadt (DE); Peter Braumann, Alzenau (DE); Thierry Charles Simon Vandevelde, Zolder (BE)

(73) Assignee: Umicore, S.A., Brussels (BE)

( * ) Notice: Subject to any disclaimer, the term of this patent is extended or adjusted under 35 U.S.C. 154(b) by 607 days.

(21) Appl. No.: 11/394,826

(22) Filed: Mar. 31, 2006

(65) Prior Publication Data

US 2007/0234851 A1    Oct. 11, 2007

(51) Int. Cl.
    *C01G 3/02*    (2006.01)
(52) U.S. Cl. .................. 423/604; 430/212; 75/343; 75/721
(58) Field of Classification Search .......... 423/579, 423/592.1, 604, 414, 415.1, 419.1, 1, 23, 423/27, 28, 44; 75/255, 343, 362, 370, 371, 75/721, 722; 430/212
See application file for complete search history.

(56) References Cited

U.S. PATENT DOCUMENTS

| | | | | |
|---|---|---|---|---|
| 2,239,519 | A * | 4/1941 | Gurwood | 75/721 |
| 2,752,237 | A * | 6/1956 | Short | 420/501 |
| 3,201,223 | A * | 8/1965 | Cuhra et al. | 75/370 |
| 4,971,754 | A * | 11/1990 | Fontet et al. | 419/8 |
| 5,785,897 | A * | 7/1998 | Toufuku et al. | 252/514 |
| 6,290,749 | B1 * | 9/2001 | White et al. | 75/721 |
| 6,660,680 | B1 * | 12/2003 | Hampden-Smith et al. | 502/180 |
| 7,201,888 | B2 * | 4/2007 | Berube et al. | 423/604 |
| 7,226,573 | B2 * | 6/2007 | Harigae et al. | 423/604 |
| 2004/0259007 | A1 * | 12/2004 | Takahashi et al. | 430/8 |
| 2006/0073667 | A1 * | 4/2006 | Li et al. | 438/311 |

FOREIGN PATENT DOCUMENTS

| | | |
|---|---|---|
| DE | 1 185 821 | 1/1965 |
| EP | 0 370 897 | 5/1990 |
| JP | 60 779 907 | 5/1985 |
| JP | 2005048237 A * | 2/2005 |

OTHER PUBLICATIONS

Pending U.S. Appl. No. 11/395,328, filed Mar. 31, 2006.
Pending U.S. Appl. No. 10/977,579, filed Oct. 29, 2004.
Goia et al., "Preparation of Monodispersed Metal Particles", *New J. Chem.*, pp. 1203-1215, (1998).
Sun et al., "Shape-Controlled Synthesis of Gold and Silver Nonoparticles", *Science*, vol. 298, pp. 2176-2178, (2002).
P. Braumann, 13th VDE Seminar Kontaktverhalten & Schalten, Karlsruhe, pp. 171-178 (1995).
M. Poniatowski et al., 7th International Conference on Electrical Contacts, Paris, pp. 477-483 (1974).

* cited by examiner

*Primary Examiner*—Stuart Hendrickson
*Assistant Examiner*—Richard M Rump
(74) *Attorney, Agent, or Firm*—Brinks, Hofer, Gilson & Lione

(57) ABSTRACT

The invention is directed to a process for manufacture of fine precious metal containing particles, specifically silver-based particles and silver-based contact materials via an intermediate silver(+1)-oxide species.

The process comprises in a first step the formation of a thermally instable silver (+1)-oxide species by adding a base to an aqueous silver salt solution comprising an organic dispersing agent. Due to the presence of the organic dispersing agent, the resulting silver (+1)-oxide species is thermally instable, thus the species is decomposing to metallic silver at temperature lower than 100° C.

The process optionally may comprise the addition of a powdered compound selected from the group of inorganic oxides, metals, and carbon-based compounds. Furthermore the process may contain additional separating and drying steps.

The process is versatile, cost efficient and environmentally friendly and is used for the manufacture of silver-based particles and electrical contact materials. Silver nanoparticles made according to the process are characterized by a narrow particle size distribution. Electrical contact materials manufactured according to the process reveal improved contact welding properties.

15 Claims, No Drawings

PROCESS FOR MANUFACTURE OF SILVER-BASED PARTICLES AND ELECTRICAL CONTACT MATERIALS

BACKGROUND OF THE INVENTION

The present invention is directed to a process for manufacture of fine precious metal-based particles, specifically to a process for manufacture of silver-based nanoparticles and electrical contact materials via an intermediate silver (+1)-oxide species. Furthermore, methods for use of the silver-based particles in conductive inks and in antimicrobial applications are disclosed.

In recent years, fine metallic particles, particularly nanoparticles, of definite shape and size have received considerable interest and attention because of their fascinating properties and potential applications, e.g. in semiconductors, consumer products, opto-electronics, electronics, catalysis, transportation, energy, medical sciences and biotechnology. The intrinsic properties of fine metallic particles are mainly determined by their size, shape, composition, crystallinity and structure.

A number of techniques have been proposed for the preparation of fine precious metal particles, including alcohol reduction, the polyol process, sonochemical methods, decomposition of organometallic precursors, vaporisation-condensation methods and electrolysis of bulk metals.

Generally, metallic silver particles are prepared in a reduction process employing reducing agents such organic acids, alcohols, polyols, aldehydes, sugars etc. (ref to D. V. Goia, E. Matijevic, *New. J. Chem.* 1998, pages 1203-1215).

In this direct (i.e. 1-step) process, a suitable Ag(+1) compound (which contains silver in the oxidation state +1) is reduced in an acidic environment (i.e. pH 0 to 5) to metallic silver with oxidation state 0.

The chemical reducing agents commonly used are toxic and/or carcinogenic compounds (e.g. hydrazine, sodium borohydride, formaldehyde) and cause safety and health problems in volume production.

In the well known polyol process, silver nanoparticles are prepared by the reduction of silver nitrate with ethylene glycol at about 160° C. The ethylene glycol serves as both reductant and solvent. Typically, stabilizing agents such as polyvinylpyrolidone (PVP) are employed (ref to Y. Sun and Y. Xia, *Science*, Vol. 298, 2176-2179 (2002)).

The drawbacks with this process are the high energy consumption, the use of expensive organic glycol solvent and the recycling of waste solvent after use.

In addition to the methods described above, the preparation of silver particles via the intermediates silver hydroxide (AgOH), silver carbonate ($Ag_2CO_3$) or silver oxide ($Ag_2O$) is state of the art. These 2-step processes require the addition of a base, usually an alkali hydroxide such as NaOH or KOH, to form an intermediate Ag(+1)-oxide species. This intermediate species is subsequently reduced by the addition of a reducing agent.

JP 60 077 907 discloses the manufacture of silver dust, wherein an aqueous silver nitrate solution is neutralized with an aqueous alkali hydroxide to form a slurry containing a silver oxide precipitate. The slurry is reduced by adding a reducing agent to prepare the silver particles.

DE 1 185 821 teaches a 2-step process for manufacture of silver powder via reduction of precipitated silver oxide with formaldehyde.

The intermediate Ag(+1)-oxide species can also be reduced by a thermal treatment. EP 370 897B1 discloses a 2-step process for manufacture of silver/tin oxide contact materials, by precipitation of $Ag_2O$ with a strong base in the presence of tin oxide. In a further step, the silver oxide is thermally reduced at temperatures in the range of 200 to 500° C. to form metallic silver.

The high temperatures employed cause high energy costs due to heating of the reaction mixtures. Furthermore, due to the boiling point of water, the required temperatures cannot be achieved in water-based reaction processes. Therefore additional separation steps are necessary prior to the heat treatment. As a result, the production process according to EP 370 897B1 is expensive and complex.

In summary, the presently known processes for preparation of silver particles (either by 1-step or by 2-step processes) are not sufficient in terms of environmental safety, process simplicity, raw materials costs and energy costs.

It was an objective of the present invention to provide a new process for manufacture of precious metal-based particles, particularly silver-based particles.

It was another objective of the present invention to provide a new process for manufacture of silver-based electrical contact materials.

These processes should be, for example, versatile, simple, straight-forward, energy-saving, cost-efficient and environmentally friendly.

It was a further objective of the present invention to provide silver nanoparticles and silver-based electrical contact materials with improved material characteristics.

These objectives are met by the processes and products of the present invention.

SUMMARY OF THE INVENTION

The present invention comprises a process for manufacture of a thermally instable silver(+1)-oxide species, wherein a base is reacted with an aqueous silver salt solution in the presence of an organic dispersing agent. The thermally instable silver(+1)-oxide species may comprise hydroxy-(OH), oxy-(O), hydrocarboxy-($HCO_3$) or carboxy-($CO_3$) groups and mixtures or combinations thereof. The present invention also provides a process for the manufacture of fine silver-based particles, preferably for the manufacture of silver nanoparticles. This process comprises the preparation of the thermally instable silver(+1)-oxide species described above and comprises the steps of a) reacting a base with an aqueous silver salt solution in the presence an organic dispersing agent to form a thermally instable silver(+1)-oxide species, b) heating the mixture to a temperature lower than 100° C., preferably to a temperature in the range of 40 to 100° C., thereby decomposing the thermally instable silver(+1)-oxide species to metallic silver.

For a better understanding of the present invention, reference is made to the following description taken in conjunction with the examples.

DETAILED DESCRIPTION OF THE INVENTION

In preparing the preferred embodiments of the present invention, various alternatives may be used to facilitate the objectives of the invention. These embodiments are presented to aid in an understanding of the invention and are not intended to, and should not be construed to, limit the invention in any way. All alternatives, modifications and equivalents that may become obvious to those of ordinary skill upon a reading of the present disclosure are included within the spirit and scope of the present invention.

A first aspect of the present invention comprises a process for manufacture of a thermally instable silver(+1)-oxide species, wherein a base is reacted with an aqueous silver salt solution in the presence of an organic dispersing agent. The thermally instable silver(+1)-oxide species may comprise hydroxy-(OH), oxy-(O), hydrocarboxy-($HCO_3$) or carboxy-($CO_3$) groups and mixtures or combinations thereof. The thermally instable silver(+1)-oxide species may be separated after the reaction or may be used as an intermediate directly without further separation.

The thermally instable silver(+1)-oxide species may further comprise small amounts of additional precious metals species, selected from the group consisting of gold, platinum, rhodium, palladium and mixtures and alloys thereof. The total amount of additional precious metal species in the silver (+1)-oxide species should not exceed 20 wt.-% based on the total weight of said silver(+1)-oxide species.

The amount of additional precious metals should not exceed 20 wt.-% based on the total weight of said species.

A specific feature of the thermally instable silver(+1)-oxide species is the decomposition to metallic silver (Ag(0)) at very low temperatures of lower than 100° C.

In a second aspect, the present invention encloses a process for the manufacture of fine silver-based particles, preferably for the manufacture of silver nanoparticles. This process comprises the preparation of the thermally instable silver (+1)-oxide species described above and comprises the steps of
a) reacting a base with an aqueous silver salt solution in the presence an organic dispersing agent to form a thermally instable silver(+1)-oxide species,
b) heating the mixture to a temperature lower than 100° C., preferably to a temperature in the range of 40 to 100° C., thereby decomposing the thermally instable silver(+1)-oxide species to metallic silver.

The process optionally may comprise further the steps of cooling the reaction suspension to room temperature, separating the silver-based particles from the suspension and the drying of the particles. Said drying is generally performed at temperatures in the range of 20 to 150° C. with a drying time in the range of 1 to 180 minutes.

When conducting the processes of the invention, the thermally instable silver(+1)-oxide species may be formed by adding the base (e.g. aqueous NaOH solution) to the silver salt solution containing the organic dispersing agent, by adding the silver salt solution to the base containing the organic dispersing agent, or by adding the silver salt solution and the base simultaneously to an aqueous solution containing the dispersing agent. In all of these cases, silver particles can be formed in an aqueous reaction solution by a moderate heating step and without the use of hazardous chemical reducing agents.

In a preferred embodiment (simultaneous addition), the aqueous silver salt solution may be prepared separately and then added simultaneously with the base to a reaction vessel containing an aqueous solution of the organic dispersing agent to form the thermally instable silver(+1)-oxide species in step a). Subsequently, the suspension is heated to temperatures lower than 100° C., preferably in the range of 40 to 100° C., thereby the decomposition of the silver(+1)-oxide species occurs.

In a third aspect, the present invention comprises a process for the manufacture of electrical contact materials. In this embodiment, the process further comprises the presence of a powdered compound. The powdered compound may be added to the aqueous silver salt solution. When conducting the process in a simultaneous way, the powdered compound may also be added to the aqueous solution of the organic dispersing agent in the reaction vessel.

In a preferred version of this embodiment, the process may be performed by separating the alkaline mother liquor from the precipitated silver particles after step b) and redispersing the silver particles in deionized water. In this case, powdered compounds, which are instable in alkaline and acidic environments, can be used.

The powdered compound may comprise inorganic oxides, metals, metal carbides, carbon-based compounds and mixtures and combinations thereof. Examples for powdered inorganic oxides are $SnO_2$, $In_2O_3$, $Bi_2O_3$, CuO, $MoO_3$, $WO_3$, ZnO, $NbO_3$, $TiO_2$, $SiO_2$, $ZrO_2$, $HfO_3$, $GeO_2$ and mixtures and combinations thereof. Examples for powdered metals are non-precious metals (base metals) such as Ni, Co, W, Cu, Zn and mixtures and combinations thereof. Examples for carbon-based compounds are carbides (such as e.g. WC), carbon black, graphite, carbon fibers, carbon nanotubes and mixtures and combinations thereof.

Typically, the amount of powdered compound present in the process is in the range of 1 to 80 wt.-%, preferably 3 to 50 wt.-% based on the total weight of the silver-based contact material The contact materials made according to the processes of the invention contain very fine silver particles and are particularly suitable for the manufacture of electrical contacts such as, for example, Ag/Ni, Ag/$SnO_2$ and Ag/graphite.

Generally, as with the intermediate Ag(+1)-oxide species, the resulting silver-based particles may also comprise small amounts of additional precious metals species, selected from the group consisting of gold, platinum, rhodium, palladium and mixtures and alloys thereof. The total amount of additional precious metals species in the silver-based particles should not exceed 20 wt.-% based on the total weight of said particles.

The process of the present invention is based on the 2-step method for preparation of silver particles via an intermediate Ag(+1)-oxide species. This intermediate compound is formed by the addition of a base (e.g. an aqueous solution of NaOH) to the aqueous silver salt solution (e.g. $AgNO_3$) in the first step [step (a)]:

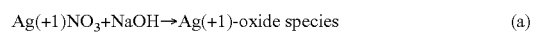

Ag(+1)$NO_3$+NaOH→Ag(+1)-oxide species    (a)

In the second step [step (b)], metallic silver particles are generated by thermal decomposition of the intermediate Ag(+1)-oxide species:

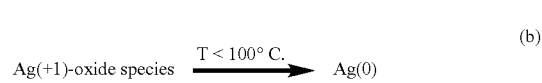

(b)

Ag(+1)-oxide species $\xrightarrow{T < 100°\ C.}$ Ag(0)

In the process of the present invention, the presence of an organic dispersing agent in the reaction mixture during formation of the Ag(+1)-oxide species is essential. It was found that, when the organic dispersing agent is present during the formation of the Ag(+1)-oxide species, the thermal decomposition of this species to metallic silver Ag(0) already takes place at very low temperatures, i.e. at temperatures lower than 100° C. Due to the presence of the organic dispersing agent in step a) of the process, the intermediate Ag(+1)-oxide species becomes thermally instable and decomposes at much lower temperatures as known from the prior art. This effect is surprising and the reasons for it are not yet understood. Eventually, specific nucleation and growth processes in particle formation may play a role. Additionally, the small particle size of the intermediate oxygen-containing Ag(+1) species could be of importance.

The low temperature decomposition reaction can be monitored and confirmed by XRD measurements. The XRD spectra of the resulting silver nanoparticles show the reflexes of metallic Ag(0) only, any additional peaks of other Ag compounds are missing.

The organic dispersing agent used in the process of the present invention is generally a surface-active polar organic compound lowering the surface tension, when added to the reaction mixture in small amounts. Suitable organic dispersing agents are water-miscible or water soluble compounds selected from the group consisting of anionic surfactants, cationic surfactants, non-ionic surfactants, ampholytic surfactants, polar organic solvents, protective colloids, stabilizing agents and mixtures and/or combinations thereof.

Suitable anionic, cationic, non-ionic or ampholytic surfactants contain a hydrophobic and a hydrophilic portion in the molecule. Examples are polyethylene glycol-400 (PEG), sodium dodecylsulfonate (SDS), Cetyl-trimethylammoniumbromide (CTAB) or Bis(2-ethylhexyl)sulfosuccinate sodium salt.

As polar organic solvents, organic ketone compounds such as methyl-ethylketone, acetylacetone, dimethylketone, diethylketone, diacetone-alcohol and mixtures and combinations thereof are preferred.

Examples for suitable protective colloids are water-soluble polymers such as poly-ethyleneoxide (PEO) and polyvinylpyrolidone (PVP).

Suitable stabilizing agents are polysaccharides selected from the group consisting of carbohydrates, gum traganth, dextrose, gum arabic, carboxymethylcellulose, hydroxy-methylcellulose, gelatine and mixtures and combinations thereof.

Preferably, the organic dispersing agent is added to the aqueous solution of the silver salt prior to adding the alkali hydroxide solution. When conducting the simultaneous addition of the silver salt and the alkali hydroxide solution in parallel, the organic dispersing agent is added to a aqueous solution in the reaction vessel. When adding the silver salt solution to an alkali hydroxide base, the organic dispersing agent is added to the alkali hydroxide solution in the reaction vessel.

Typically, the ratio of water/organic dispersing agent in the reaction mixture (prior to starting the process) is in the range of 100:1 to 1:6, preferably in the range of 50:1 to 1:3.

The silver salt should be readily water soluble and is selected from the group of silver nitrate, silver acetate, silver oxalate, silver citrate, silver sulfate, silver thiosulfate and mixtures and combinations thereof.

As the base, aqueous solutions of the alkali hydroxides, i.e. sodium hydroxide, potassium hydroxide, lithium hydroxide and mixtures and combinations thereof, may be employed. Examples for suitable bases are 10M or 2M NaOH solutions. Additionally, sodium carbonate or potassium carbonate may be used.

For thermal decomposition of the intermediate Ag(+)-oxide species, the reaction mixture is heated to temperatures lower than 100° C., preferably to temperatures in the range of 40 to 100° C., The heating step is performed for a period of 1 to 180 minutes, preferably for a period of 10 to 120 minutes. Subsequently the suspension may be cooled to room temperature.

The silver-based particles obtained by the process of the present invention are characterized by a very small medium particle size ("d50"-value). Typically, the medium particle size is in the range of 1 to 1,000 nm, preferably in the range of 1 to 750 nm and, most preferably, in the case of silver nanoparticles, it is in the range of 1 to 50 nm. Due to the unique manufacturing process, the silver-based particles reveal a very narrow particle size distribution, characterized by a very low percentage of coarser particles. For a given medium particle size (d50) of N nm for a specific type of silver nanoparticles, the maximum size of the particles (i.e. the "d100" value) will not exceed 3×N nm. This result can be given by the following correlation:

$$d100(nm) \leq 3 \times d50(nm)$$

As an example, for silver nanoparticles with a medium particle size of d50=25 nm, the maximum particle size is 75 nm, i.e. all particles are equal to/smaller than 75 nm (ref to Example 3). This limitation in maximum particle size is due to the unique manufacturing method, in which the nucleation and growth processes of the thermally instable silver(+1)-oxide particles are strictly controlled. This specific narrow particle size distribution (i.e. the absence of coarse particles) is very advantageous for various applications, for example when dispensing and printing of inks comprising the nanoparticles.

The silver particles may be used in wet form or in a water-based suspension for manufacture of conductive silver inks and screen-printable pastes. Due to their unique particle size distribution (d100≦3×d50, ref to above), sintering of the silver particles occurs at very low temperatures, i.e. below 150° C. Silver inks containing the particles produced according to the present invention thus yield a very high electrical conductivity (close to Ag bulk conductivity) at very low sintering temperatures <150° C.

The silver particles obtained by the process of the present invention may further be used in medical and antimicrobial applications. Since the silver particle suspension does not contain any reducing agents or traces of their reactant residues, the suspension virtually comprises only non-toxic ingredients. Thus, the silver-based nanoparticles may be used for medical and health-care applications, such as for the interaction with viruses and bacteria. Antimicrobial applications may enclose, for example, antimicrobial coatings for home appliances, bathroomware, textiles, shoes and clothing.

Furthermore, the processes of the present invention are particularly suitable for manufacture of electrical contact materials. Contact materials made according to the present invention may contain a very broad range of different powdered compounds with a great variety of particle sizes. Therefore, the processes of the present invention are very versatile and superior regarding product flexibility compared to conventional powder mixing and chemical precipitation processes. The contact materials comprising the silver-based particles of the present invention show a very high degree of homogenity and a uniform dispersion of silver, leading to superior functional characteristics. As an example, these contact materials reveal improved contact welding properties and very low erosion rates. They can withstand a larger number of switching cycles compared to conventional silver-based products. Thus, these contact materials show a significant elongated service life compared to standard materials.

Analytical Methods

The medium and maximum particle size (d50 and d100 values) and the particle size distribution was characterized by high magnification Transmission Electron Microscopy (TEM), Scanning Electron Microscopy (SEM) or by UV-VIS spectroscopy methods. The particle size distribution is determined by TEM/SEM on a sampling of 300 randomly chosen particles. Such methods are well known in the state of the art.

Conventional X-ray diffraction (XRD) was applied for particle characterisation and composition analysis.

The silver content of the products was determined by standard analytical methods. For quantitative analysis of Ag, a volumetric titration method was used.

Electrical Testing of Contact Materials

For the assessment of the contact welding properties of silver-based contact materials made according to the invention, the method described in P. Braumann, 13$^{th}$ VDE-Seminar "Kontaktverhalten und Schalten", Karlsruhe, 1995, pages 171-178, was applied. The tests were performed in the model switches described in said publication for a given number of switching cycles. As a general feature, the relay coil current was lowered in order to provoke contact welding due to reduced opening force. Detailed testing conditions and results are given in Example 5.

For measurement of contact welding force and specific contact erosion properties of Ag/C contact materials, the model switches and methods described by M. Poniatowski et al., 7$^{th}$ International Conference on Electrical Contacts, Paris 1974, pages 477-483, were applied. Detailed testing conditions and results are given in Example 6.

The present invention is illustrated by the following examples. These are merely illustrative and should not be construed as limiting the scope of the invention.

EXAMPLES

Example 1

Preparation of the Ag(+1)-Oxide Species 250 ml of methylethyl ketone (MEK) were added to 1.5 l of an aqueous 4.4 M silver nitrate solution (AgNO$_3$, Umicore, Hanau). The water/MEK ratio in the reaction mixture was 6:1. By adding of 1 l of a 10 M NaOH solution within 30 minutes, a fine precipitate of an Ag(+1)-oxide species was obtained. If necessary, the Ag(+1)-oxide intermediate, it can be separated from the mother liquor with a suction funnel and subsequently washed with DI water and ethanol. For further use in subsequent processing steps, the Ag(+1)-oxide intermediate can be stored in aqueous suspension.

Preparation of Silver Particles

The aqueous suspension of the Ag(+1)-oxide intermediate as prepared in example 1a) was used. The temperature was raised to 70° C. and the reaction mixture was stirred for 45 minutes. A change of color from dark brown to light grey occurred, while the silver particles were formed. The silver particles were separated from the mother liquor with a suction funnel and subsequently washed with deionized (DI) water and twice with ethanol. Thereafter, the particles was dried overnight at 60° C. and screened through a 250 µm screen.

Particle Characteristics:

| | |
|---|---|
| Medium Ag particle size (TEM): | d50 = 450 nm |
| Particle composition (XRD): | metallic Ag(0) reflexes only |

Example 2

Preparation of Silver Nanoparticles

For the preparation of a 20 gram batch of nano-sized silver particles, 10 g of polysaccharide (Frutarom, North Bergen, N.J., USA) were dissolved in 400 ml DI water for at least 30 min and the temperature was adjusted to 25° C. In this polysaccharide solution 31.5 gram AgNO$_3$ (supplied by Umicore, Hanau) were dissolved. By adding of 30 ml of a 10 M NaOH solution under very strong agitation, a fine precipitate of a Ag(+1)-oxide species was obtained. The temperature was then raised to 60-65° C. and the suspension was stirred for at least 45 minutes.

The resulting silver nanoparticles were separated from the mother liquor and subsequently washed with DI water and ethanol. Thereafter, the powder was dried overnight at 60° C. and screened through a 100 mesh stainless steel screen.

Particle Characteristics:

| | |
|---|---|
| Medium Ag particle size (TEM): | d50 = 25 nm |
| Maximum particle size (TEM): | d100 = 75 nm |
| Medium Ag particle size (UV-VIS): | 30 nm (in dispersion) |
| Particle composition (XRD): | metallic Ag(0) reflexes only |

Example 3

Preparation of Silver Nanoparticles (Simultaneous Addition Process)

For the preparation of a 20 gram batch of silver nanoparticles, a solution of 31.5 gram AgNO$_3$ (supplied by Umicore, Hanau) were dissolved in 100 ml DI water in a separate container. Thereafter, 5 g of polysaccharide (ref to Example 2) were dissolved in a mixture of 200 ml DI water and transferred into the reaction vessel. Then, 150 ml of a 2 M aqueous solution of NaOH were prepared.

The reaction was started by adding the AgNO$_3$ solution and the 2M NaOH solution simultaneously under strong agitation to the reaction vessel containing the aqueous solution of the polysaccharide. Thereby, the Ag(+1)-oxide species was generated. The temperature was then raised to 60-65° C. and the suspension was stirred for 45 minutes. The resulting silver nanoparticles were separated from the mother liquor and subsequently washed with DI water and ethanol. Thereafter, the particles were dried overnight at 60° C. and screened through a 100 mesh screen.

Particle Characteristics:

| | |
|---|---|
| Medium Ag particle size (TEM): | d50 = 20 nm |
| Maximum particle size (TEM): | d100 = 60 nm |
| Medium Ag particle size (UV-VIS): | 23 nm (in dispersion) |
| Particle composition (XRD): | metallic Ag(0) reflexes only |

Example 4

Preparation of Silver Particles on Tin Oxide/Tungsten Oxide (Ag/SnO$_2$/WO$_3$)

For the preparation of a 750 gram batch of Ag/SnO$_2$/WO$_3$ composite material with 11.9 wt.-% tin oxide and 0.1 wt.-%

WO$_3$, 74.25 grams of tin oxide powder (SnO$_2$, d50=0.7 µm, supplied by Keeling&Walker, UK) were dispersed by ultrasonic energy (sonicated in 1.5 l of DI water in a 5 l beaker for 15 minutes).

Thereafter, 1,062.5 grams of AgNO$_3$ (Umicore, Hanau) were added to the tin oxide dispersion and dissolved by stirring at 800 rpm for 10 minutes. 1.5 l of MEK solvent were added to the reaction mixture. The water:ketone ratio was 1:1.

Then, 1 l of aqueous sodium hydroxide solution (NaOH, 10M) was added over 30 minutes. The temperature was then raised to 60-65° C. and the mixture was stirred for additional 60 minutes. The solids were isolated from the mother liquor with a suction funnel and washed with DI water and ethanol.

Subsequently, the Ag/SnO$_2$ composite material was redispersed together with 0.75 grams of tungsten oxide powder (WO$_3$, d50=2 µm, supplied by Sigma-Aldrich, Switzerland) in 3 l of DI water in a 5 l vessel by means of a high speed mixing device (rotation speed 10.000 l/min for 15 minutes). The solids were isolated from the dispersing liquid with a suction funnel, dried overnight at 100° C. The resulting product was then screened through a 100 mesh stainless steel screen.

Powder Characteristics:

| | |
|---|---|
| Medium Ag particle size (TEM): | d50 = 465 nm |
| Silver content: | 87.97 wt.-% |

Example 5

Preparation of Silver Particles on Nickel (Ag/Ni)

For the preparation of a 750 gram batch of a Ag/Ni composite material with 10 wt.-% nickel, 75 grams of spherical nickel powder (d50=200 nm, supplied by NanoDynamics, Inc.; type ND 200) were dispersed in 1.5 l of DI water in a 5 l beaker and ultrasonically treated (sonicated) for 5 minutes. Thereafter, 1,062.5 grams of AgNO$_3$ (Umicore, Hanau) were added to the Ni powder dispersion and dissolved by stirring at 800 rpm for 10 minutes. Thereafter, 1.5 l of MEK were added to the AgNO$_3$/Ni powder dispersion. The water/ketone ratio was 1:1.

Then, 1 l of aqueous sodium hydroxide solution (NaOH, 10M) was added over 15 minutes. The temperature was raised to 60-65° C. and the dispersion was stirred for additional 60 minutes. The solids were isolated from the mother liquor by a suction funnel and washed with DI water and ethanol. The powder was dried overnight at 100° C. and finally screened through a 100 mesh stainless steel screen.

Powder Characteristics:

| | |
|---|---|
| Medium Ag particle size (TEM): | d50 = 340 nm |
| Ag-content: | 89.87 wt.-% |

Electrical Testing of Contact Welding Properties

For the assessment of the contact welding properties of the Ag/Ni contact material, a wire with a diameter of 1.5 mm was produced by extrusion and wire drawing. From this wire, rivets were produced and implemented in standard commercial relays. For comparison, similar rivets of a Ag/Ni standard material with the same composition were produced by traditional dry powder blending, extrusion and wire drawing. The tendency for contact welding was assessed by the method of Braumann (ref to specification). The contacts are defined as "welded" as soon as there is no opening of the circuit within 1 second after starting the "break" operation.

Further test conditions were as follows: room temperature 25° C., test voltage: 13.5 V, continuous current 10 A; peak current at make 21 A, relay coil current 140/110 mA (reduced value in comparison to standard value of 140 mA to provoke contact welding due to reduced opening force).

Under these conditions, 5 different relays of both Ag/Ni contact material types were tested. First, 10,000 switching cycles were run with a standard coil current of 140 mA to achieve stable conditions and then further 10,000 cycles were run under reduced coil current of 110 mA, to provoke contact welding. The number of failures (i.e. contact weldings) occurring during the second test run were recorded (ref to Table 1).

TABLE 1

Contact welding properties of Ag/Ni contact materials

| Material | Relay No | number of contact weldings |
|---|---|---|
| Ag/Ni (this invention) | 1 | $N_1$ = 271 |
| | 2 | $N_1$ = 234 |
| | 3 | $N_1$ = 256 |
| | 4 | $N_1$ = 263 |
| | 5 | $N_1$ = 298 |
| Ag/Ni (reference) | 1 | $N_0$ = 1014 |
| | 2 | $N_0$ = 1067 |
| | 3 | $N_0$ = 986 |
| | 4 | $N_0$ = 998 |
| | 5 | $N_0$ = 1054 |

As can be seen from Table 1, the Ag/Ni contact materials of the invention reveal a significantly improved resistance against contact welding compared to the reference material. Particularly the number of contact weldings is markedly reduced. This improvement can be described by a relative failure ratio $N_1/N_0$ according to the correlation $$N_1/N_0 \leq 0.30$$

wherein $N_1$=number of weldings for contact material according to this invention $N_0$=number of weldings for reference contact material Example 6

Preparation of Silver Nanoparticles on Graphite (Ag/C)

For the preparation of a 750 gram batch of Ag/C composite material with 5 wt.-% graphite, 37.5 g of a graphite powder (Type KS6, Timcal Duesseldorf, Germany, d50=3.5 µm) were mixed with 250 ml DI water in a 1 l vessel for 60 minutes in a mixing device. Thereafter, 1.25 l of a 5.3 M aqueous AgNO$_3$ solution (Umicore, Hanau) and 250 ml MEK were added to the graphite powder dispersion. The water:ketone ratio was 6:1. By adding 1.0 l of an aqueous sodium hydroxide solution (NaOH, 10M) over 30 minutes, a fine powder was obtained.

The temperature was then raised to 65-70° C. and the dispersion was stirred for additional 60 minutes. The solids were separated and washed with DI water and ethanol. Thereafter, the powder was dried overnight at 100° C. and then screened through a 250 µm screen.

Powder Characteristics:

| | |
|---|---|
| Medium Ag-particle size (SEM): | d50 = 630 nm |
| Silver content: | 95.07 wt. % |

Electrical Testing of Contact Welding Force (CWF):

For the determination of the contact welding force values of Ag/C contact materials, a profile was produced by extrusion and rolling. From this profile, contact tips were produced and implemented into "make"-operation and "break"-operation model switches. For comparison and reference, similar tips of a Ag/C standard material with the same composition were produced by traditional dry powder blending, extrusion and profile rolling. The "make"-operation and "break"-operation model switches are described by Poniatowski et al. (ref to specification).

The model switch for "make"-operation was operated at 700 A, 230 V, AC for 300 cycles. For measurement of the contact welding force at the "make" operation step, the test system was equipped with a device for measuring the force (in Newton, N), which must be applied in order to achieve an opening of the switch at zero current. A 95% value is recorded, i.e. 95% of the force values (in N) are below the given value.

TABLE 2

Contact welding forces (CWF) of Ag/C contact materials

| Material | Relay No. | CWF (in N) |
|---|---|---|
| Ag/C (this invention) | 1 | <1.9 |
| | 2 | <2.3 |
| Ag/C (reference) | 1 | <4.4 |
| | 2 | <5.0 |

As can be seen from Table 2 the Ag/C contact materials prepared according to this invention reveal a significantly lower contact welding force compared to the reference Ag/C material, thus again demonstrating the improved contact welding properties. The contact welding forces (95%-values) displayed by the Ag/C contact material according to the present invention are about half of the force necessary for the reference material Determination of Specific Contact Erosion (SCE):

For the determination of the specific contact erosion of Ag/C contact materials, the same testing equipment as previously described was used. The specific contact erosion of the contact material was calculated by the quotient of weight loss of the contact tips (in μg) and the electric arc energy (in Ws):

$$SCE = \frac{\text{weight loss of contact material (in μg)}}{\text{electric arc energy (in Ws)}}$$

The specific contact erosion was determined in "make"-operation and "break" operation model switches. For comparison and reference, tips of a Ag/C standard material were tested in parallel. Results are given in Table 3.

TABLE 3

Specific contact erosion (SCE) of Ag/C contact materials

| Material | Test No | SCE (in μg/Ws) | SCE (in μg/Ws) |
|---|---|---|---|
| Ag/C (this invention) | 1 | 11.4 | 12.5 |
| | 2 | 10.7 | 11.9 |
| Ag/C (reference) | 1 | 15.6 | 18.9 |
| | 2 | 16.3 | 19.6 |
| Switch type | | "Make"-operation | "Break"-operation |

As can be seen from Table 3, the Ag/C contact materials prepared according to this invention reveal significantly lower specific contact erosion values (SCE-values) compared to the reference Ag/C materials, thus again demonstrating the improved material properties. For both switch operation modes ("make" and "break"), the values for SCE are about 30% lower compared to the reference Ag/C material.

Example 7

Conductive Ink Comprising Silver Nanoparticles

The silver particles obtained in Example 2 are added in wet form to a suitable organic resin system and dispersed therein for manufacturing of a conductive silver ink. Due to the small particle size and unique particle size distribution, the sintering of the silver particles occurs at very low temperatures. The silver ink based on the nanoparticles produced according to Example 2 yields excellent electrical conductivity (close to Ag bulk conductivity) after drying at temperatures of lower than 150° C.

While the invention has been described with reference to specific embodiments thereof, it should be understood that the invention is capable of further modifications and that this application is intended to cover any and all variations, uses, or adaptations of the invention which follow the general principles of the invention. All such alternatives, modifications and equivalents that may become obvious to those of ordinary skill in the art upon reading the present disclosure are included within the spirit and scope of the invention as reflected in the appended claims.

What is claimed:

1. A process for manufacture of silver-based particles; comprising the steps of a) preparing a thermally instable silver(+1)-oxide species in a reaction mixture by reacting a silver(+1) salt solution in the presence of an organic dispersing agent comprising polysaccharides, wherein the ratio of water/organic dispersing agent in the reaction mixture is in the range of 50:1 to 1:3, and b) heating the reaction mixture to a temperature between 40 and 100° C., thereby decomposing said thermally instable silver(+1)-oxide species to metallic silver.

2. The process according to claim 1, further comprising the step of separating the silver-based particles from the mixture and optionally the step of drying the particles.

3. The process according to claim 1, wherein step a) comprises the simultaneous addition of a silver salt solution and a base to a solution containing the organic dispersing agent to form the thermally instable silver(+1)-oxide species.

4. The process according to claim 1, wherein the medium particle size (d50) of the silver-based particles is in the range of 1 to 50 nm.

5. A process for manufacture of a silver-based electrical contact material comprising the steps of: a) preparing a thermally instable silver(+1)-oxide species in a reaction mixture by reacting a silver(+1) salt solution in the presence of an organic dispersing agent comprising polysaccharides, wherein the ratio of water/organic dispersing agent in the reaction mixture is in the range of 50:1 to 1:3, in the presence of a powdered compound, and b) heating the reaction mixture to a temperature between 40 and 100° C., thereby decomposing said thermally instable silver(+1)-oxide species to metallic silver in the presence of said powdered compound.

6. The process according to claim 5, further comprising separating the silver-based contact material from the reaction mixture and optionally drying said contact material.

7. The process according to claim 5, wherein step a) comprises the simultaneous addition of a silver salt solution and a base to a solution containing the organic dispersing agent to form the thermally instable silver(+1)-oxide species in the presence of a powdered compound.

8. The process according to claim 5, wherein the powdered compound is selected from the group of inorganic oxides, metals, carbon-based compounds (including carbides), and mixtures and combinations thereof.

9. The process according to claim 5, wherein the powdered compound is an inorganic oxide such as $SnO_2$, $In_2O_3$, $Bi_2O_3$, CuO, $MoO_3$, $WO_3$, ZnO, $NbO_3$, $TiO_2$, $SiO_2$, $ZrO_2$, $HfO_3$, $GeO_2$, a metal such as Ni, Co, W, a carbon-based compound such as WC, carbon black, graphite, carbon fibers or carbon nanotubes.

10. The process according to claim 5, wherein the amount of the powdered compound is in the range of 5 to 50 wt.-%, based on the total weight of the silver-based contact material.

11. The process according to claim 5, further comprising the separation of the product from the reaction mixture after step b), the redispersing of the product in water and the addition of an additional powdered compound.

12. Silver-based particles made by the process of claim 1.

13. Conductive ink comprising the silver-based particles according to claim 12.

14. The process according to claim 1, wherein the medium particle size (d50) of the silver-based particles is in the range of 1 to 750 nm.

15. The process according to claim 5, wherein the amount of the powdered compound is in the range of 1 to 80 wt.-%, based on the total weight of the silver-based contact material.

* * * * *